United States Patent [19]
Eilers et al.

[11] 3,839,263
[45] Oct. 1, 1974

[54] CEMENTITIOUS COMPOSITIONS AND METHODS

[75] Inventors: Louis H. Eilers, Inola; Christ F. Parks, Tulsa, both of Okla.

[73] Assignee: The Dow Chemical Company, Midland, Mich.

[22] Filed: Nov. 21, 1972

[21] Appl. No.: 308,492

Related U.S. Application Data

[60] Division of Ser. No. 161,875, July 12, 1971, Pat. No. 3,746,725, which is a continuation-in-part of Ser. Nos. 17,290, March 6, 1970, Pat. No. 3,624,048, and Ser. No. 486,530, Sept. 10, 1965, Pat. No. 3,511,313.

[52] U.S. Cl. ..................... 260/33.2 R, 260/33.4 R
[51] Int. Cl. ........................................... C08f 45/34
[58] Field of Search......... 260/33.2 R, 33.4; 166/33, 166/295

[56] References Cited
UNITED STATES PATENTS
2,961,044  11/1960  Shell .................................. 166/21
3,493,529  2/1970  Krottinger ......................... 260/29.6
3,511,313  5/1970  Eilers .......................... 260/32.6 N X
3,746,725  7/1973  Eilers ............................. 260/33.4 R

*Primary Examiner*—Allan Lieberman
*Assistant Examiner*—Richard Zaitlen
*Attorney, Agent, or Firm*—Bruce N. Knauch

[57] ABSTRACT

The sealing of void spaces, e.g. as in geological formations and/or between metal shapes is accomplished with a liquid slurry of a particulate, water-soluble organic polymer in an organo solvent. The mixture of the polymer and solvent has a controlled set time to allow the emplacement of the slurry as a liquid. The slurry then sets to form a sealing cementitious material.

6 Claims, No Drawings

CEMENTITIOUS COMPOSITIONS AND METHODS

CROSS-REFERENCE TO RELATED APPLICATION

This is a division of application Ser. No. 161,875, filed July 12, 1971 now U.S. Pat. No. 3,746,725 which in turn is a continuation-in-part of application Ser. No. 17,290, filed Mar. 6, 1970 now U.S. Pat. No. 3,624,048 and application Ser. No. 486,530, filed Sept. 10, 1965 now Pat. No. 3,511,313.

The present invention provides a novel approach to a variety of cementing needs. It is particularly beneficial for use in geological formations. The formulations described herein set to hard gels of excellent strength properties and with adhesion to a large number of substrates. Control of the set times of the cementitious formulations permits convenient application of the compositions as readily flowable liquids. Particular uses of the gels include sealing oil well boreholes, cementing well casings to adjacent formations and coating geological formations to render them impermeable to fluids.

In general, the method of the invention comprises applying to void space defined by solid surfaces a liquid slurry of a particulate, water-soluble, organic polymer and an organo solvent therefor and maintaining the liquid mixture in such void space until it has hardened into a shape retaining gel, i.e., set.

The terminology "water-soluble organic polymer" as used herein refers to nonionic, anionic, cationic or ampholytic organic materials composed of a number of repeating units or mers. The useful polymers are characterized by dispersibility in water to form visually continuous solutions or dispersions. This includes truly water-soluble polymers which disperse in water to provide homogeneous, transparent solutions subject to water dilution without phase separation. Also included within the meaning of water-soluble, as used herein, are the water-swellable polymers which readily disperse in water to produce a highly disperse and visually continuous system of individually distinct, gel particles.

Organo solvents useful in the invention fall into three general classes. Each class is characterized by unique gel forming characteristics and in the properties of the final hardened gel. Although the organo solvent used may consist of only organic materials it may also be mixed with water, or, in fact, any desired liquid material compatible with the solvent to produce a variation within the invention. As used herein the term "organo solvent" refers to a homogeneous liquid composed substantially of an organic material, that is, it contains no more than about 50 percent by weight of water, which organo solvent is absorbed by the particulate polymer to form a continuous phase.

The first class of organo solvents useful in the invention, hereinafter termed Group I solvents, are the liquid organic solvents which solvate or plasticize solid, water-soluble polymers. That is, the polymers, if they are not totally miscible with the solvent, absorb a significant proportion of the same. Solvents of this nature, suitable for use with a wide variety of water-soluble polymers, include for example ethylene glycol, ethylenediamine, glycerol, dioxolane, formamide, pentaerythritol and acetic acid. Some materials may not function as solvents at normal room temperatures but can be activated as solvents for most water-soluble polymers at elevated temperatures. Such materials include diethylene glycol, dipropylene glycol, diethanol amine, monoethanol amine, propylene glycol, triethylene glycol, diethylenetramine and triethanolamine.

A second class of useful organo solvents, hereinafter termed Group II solvents, includes a large number of organic materials which are not solvents for the polymers (non-solvents), i.e., they do not solvate or plasticize the water-soluble polymers to form a continuous phase, but which, when mixed with a small amount of water, produce organo solvents useful for the purpose of the invention. Manifestly, such materials must be miscible with water. It has been found that as little as 1 percent by weight water dissolved in an organic liquid, which is not a solvent for the polymer, often renders the resulting mixture a suitable organo solvent for the purposes of the invention. Sometimes the organic material may normally exist as a solid. In such instances, enough water, e.g., up to 50 percent by weight of the total solvent composition may be used to provide a liquid solution of the organic material. The resulting aqueous solution is an organo solvent suitable for the purposes of the invention. Since the set time of a formulation is decreased by increases in the water content of the organo solvent used, the amount of water is usually maintained at less than about 25 percent by weight of the total solvent composition.

Materials which are not normally solvents for the water-soluble polymers, but which on addition of water become such solvents at room temperature, e.g., 75°F., include diethylene glycol, dipropylene glycol, diethylene glycol monomethylether, ethylene glycol monoethylether, dioxane, ethylene carbonate, ethanolamine, triethylene glycol, propylene glycol, sucrose, urea, dextrin, diethanol amine, triethanol amine, and diethylene triamine. A most useful class of organic materials for formulating Group II solvents includes the liquid alkylene oxide polymers, which are not solvents in themselves for the water-soluble polymers. Such alkylene oxide polymers include, in addition to those mentioned above, higher polymers of ethylene oxide having molecular weights up to as much as 600 or so. Liquid propylene oxide polymers include tripropylene glycol, tetrapropylene glycol and higher propylene oxide polymers having molecular weights up to as much as 1,200 or so. In addition, water-soluble alkyl and aryl monoethers of the alkylene oxide polymers can form useful solvents when mixed with water. Exemplary alkyl and aryl etherifying groups include methyl, ethyl, propyl, butyl, dodecyl, phenyl, butylphenyl and the like groups.

A third class of organo solvents, hereinafter termed Group III solvents, is composed of mutual solutions of an organic material, which is not solvent for the water-soluble polymers, and an organic material, which is a solvent for the polymer, i.e., a Group I solvent. In such mixtures, at least about 0.05 part of the polymer solvent is employed for each part by weight of the non-solvent. Such organo solvents allow convenient adjustment of the set times in non-aqueous cementitious formulations by increasing or decreasing the amount of polymer solvent relative to the non-solvent.

Controlling the set times, or in other words gel times, of water-soluble polymer-solvent mixtures, wherein the organo solvent classifies with Group I solvents, is achieved through temperature control. The temperature of the polymer-solvent mixture is decreased to a point at which gelation occurs after a given period of time as the temperature of the system equilibrates with its environment. The formulation temperature is most conveniently controlled by adjusting the temperature of the organo solvent.

In some instances, a cementitious formulation requires temperatures higher than room temperature in order to achieve a set. Examples of such solvents operable as the sole solvent only at higher temperatures have been described hereinbefore. Illustratively, diethylene glycol, propylene glycol and dipropylene glycol and diethanol amine are effective if utilized at temperatures above about 100°F. Formulations prepared with such organo solvents are most useful, with their long shelf lives, for grouting and sealing subterranean geological formations which normally exist at temperatures above 100°F. or so.

The set times of formulations prepared with Group II solvents can be adjusted by the proportion of water incorporated into the organic materials which are non-solvents for the polymers. As little as 0.5 percent by weight water, based on the total organo solvent, will appreciably shorten the set time of the formulation. Unless the polymer non-solvent requires a higher proportion of water to exist as a liquid, it is generally not desirable in the interest of providing longer set times to utilize more than 25 percent by weight water based on the weight of the total organo solvent.

The set times of formulations prepared with Group III solvents are controlled by the proportion of organic polymer solvent utilized conjunctively with the organic, polymer non-solvent. With increases in the amount of solvent in relation to the non-solvent, the set time is decreased. Organo solvents of this type are preferred for use in applications where control of set times cannot be achieved by control of temperature and a non-aqueous cement is desired.

The water-soluble, particulate organic polymers useful herein are available in a wide variety of chemical compositions. They may be obtained as natural polymeric products, by modification of natural polymers or by synthesis from polymerizable materials.

Water solubility is imparted to such polymers by the presence in and along the polymer chain of a number of hydrophilic moieties sufficient to more than offset the otherwise hydrophobic character of the organic polymer. One class of such hydrophilic moieties includes the ionizable groups. Among these are the sulfate and sulfonate groups, carboxylate salt groups, amino and ammonium groups, the latter being inclusive of protonated as well as quaternary derivatives of the amines, e.g., mono-, di and trialkyl substituted ammonium salt groups, and phosphoric acid groups and mono-and dibasic salts thereof. Whenever acid salts are referred to, those generally intended are the alkali metal, alkaline earth metal (water-soluble species thereof) and ammonium salts.

Another class of water-solubility imparting, hydrophilic moieties are such non-ionizable groups as carboxamide, and mono- and dialkyl N-substituted carboxamides, having a total of up to about eight carbons. Also of a hydrophilic nature, though less strongly than some of the aforementioned groups are, hydroxyl, acetal, ketal, carbamate and lactam groups. In any event, the polymers employed herein contain one or more of the aforedescribed hydrophilic moieties, and the like, in and along the polymer chain in a sufficient amount to render the resulting polymer water-soluble as defined above.

The polymers used in the invention are characterized by a high molecular weight. An adequate molecular weight is shown if the polymer can be obtained as a particulate solid and a 2 percent by weight solution of the polymer in water, at a pH of 7, has a viscosity, measured with a Brookfield Viscosimeter at 25°C., of at least 10 centipoises.

Technology for preparing the water-soluble polymers useful herein is known. Useful ethylenically polymerized polymers are described in Hedrick et al., U.S. Pat. No. 2,625,529, Aimone et al., U.S. Pat. No. 2,740,522 and Booth et al, U.S. Pat. No. 2,729,557. A variety of water-soluble polysaccharide derivatives are described in Gloor, U.S. Pat. No. 2,728,725. Water-soluble polyurethanes or chain extended polyols are taught in Honea et al., U.S. Pat. No. 3,054,778 and a variety of polycarbamates and polylactams in Hibbard et al., U.S. Pat. No. 3,044,992, Walles et al., U.S. Pat. No. 2,946,772, Vitales, U.S. Pat. No. 2,874,124 and Fong et al., U.S. Pat. No. 3,000,830. These are to mention but a few of the well-known chemical avenues for the preparation of water-soluble, particulate macromolecules. Further general descriptions of a variety of water-soluble, particulate macromolecules is contained in Davidson and Sittig "Water-Soluble Resins," Reinhold Publishing Corp., New York, 1962.

Preferred for use herein are water-soluble carbamoyl polymers. The most common forms of these are ethylenically polymerized polymers having attached along their polyalkane backbone a plurality of carbamoyl groups according to the formula:

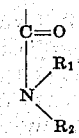

wherein $R_1$ and $R_2$ are independently selected from the group of hydrogen and alkyl hydrocarbons with one to four carbons.

In particular, useful carbamoyl polymers include the various water-soluble homopolymers and copolymers of acrylamide and methacrylamide. Other carbamoyl polymers are the various water-soluble copolymers of N-substituted acrylamides such as N-methyl acrylamide, N-propyl acrylamide and N-butyl acrylamide. Still other carbamoyl polymers are prepared from the amides and half amides of maleic and fumaric acids. In general, any ethylenically unsaturated and polymerizable monomer, which contains the carbamoyl group, may be employed in the preparation of the preferred carbamoyl polymers.

Best results are obtained, if at least about 25 mole percent of the polymerized mers have carbamoyl substituents. The balance of the comonomers used to prepare the copolymers can be provided in the form of any water-soluble, or water-insoluble, monoethylenically monomer copolymerizable therewith, so long as the total amount of water-soluble monomers used is sufficient to impart water-solubility to the finished polymer.

Other water-soluble polymers useful herein are the lightly cross-linked water-swellable polymers. Such crosslinking can be achieved by irradiation of linear, water-soluble polymers under conditions which promote crosslinking or by incorporating a small amount, e.g., up to 1 percent by weight, of a polyfunctional monomer into the polymerization recipe ofor a linear water-soluble polymer. Examples of such monomers, which may be copolymerized with monoethylenically unsaturated monomers, are methylenebisacrylamide, divinylbenzene, divinylether, divinylether of ethylene glycol and the like.

In preparing the cementitious gels of the invention, it is best to add the polymeric igredient to the organo solvent. The organo solvent is prepared first, if there is more than one material involved, to provide a uniform liquid medium. If temperature is to be relied upon to control the set time, the organo solvent is adjusted to a desired temperature. Subsequently, a particulate form of the water-soluble, solid organic polymer is incorporated into the liquid mixture. The mixture is supplied with sufficient agitation to suspend or slurry the polymer in the organo solvent. The resulting liquid slurry is then placed in the void to be sealed. Ultimately the slurry produces a shape retaining gel which tenaciously adheres to its solid environment.

The strength of the final set composition is controlled in part by the amount of the polymer used. Useful strength properties are often achieved by incorporating into the organo solvent at least about 0.1 part by weight of the polymer per part by weight of the solvent. In any event, at least enough of the polymer is used to achieve gellation of the composition. This can be insured by employing at least about 0.5 part by weight of the polymer per part by weight of the organo solvent. The upper limit of polymer usage is controlled only by the need to provide a flowable liquid slurry. Generally, no more than about 2 parts by weight of the polymer per part by weight of the solvent are used.

Mixing of the ingredients is readily achieved using conventional solids-liquids mixing devices. Emplacement of the resulting fluid admixture is achieved by any of the usual liquid slurry handling means. For instance, ordinary centrifugal pumps are satisfactory for pumping the slurry. If needed, the slurry is easily maintained in the void space to be sealed until it sets by suitable confining forms and/or suitably applied fluid pressure.

In a special embodiment of the invention, the cementitious composition of the invention has been discovered to be further enhanced with respect to its properties, especially its cohesive strength, by incorporating into the composition an oxide, hydroxide or salt of a polyvalent metal. Specific oxides, hydroxides and salts, all of which must have some solubility, however slight, in the liquid phase, include those of the following metals: calcium, magnesium, zinc, ferric, aluminum and the like. Useful salts include the chlorides and sulfates of these metals. The use of from about 0.05 percent up to a maximum of about 12 percent based on the weight of the polymer-solvent compositions, of one or more of the aforementioned inorganic materials increases substantially the yield strength or cohesiveness of the finally set cementitious compositions of the invention.

When set, the formulations of the invention provide tough fluid barriers with good adhesion to a wide variety of substrates, specifically including most geological formations, especially siliceous formations. Once set, the cementitious compositions of the invention are relatively impervious to water. They will imbibe water when in contact with aqueous media, but if confined, as within a formation or well casing, they will not lose their strength properties even after prolonged contact with aqueous media.

The following examples provide further illustration of the invention.

EXAMPLE 1

This example illustrates formulating cementitious gels according to the invention using Group I and Group II organo solvents. To 100 milliliters of ethylene glycol at a temperature of 75°F. was added 75 grams of a particulate carbamoyl polymer. The polymer was a polyacrylamide in which about 7 percent of the initially available carboxamide groups had been hydrolyzed to sodium carboxylate groups. It was characterized by a molecular weight of at least about one million. The polymer was stirred into the ethylene glycol to produce a uniform blend at about 75°F. (approximate room temperature). The composition set to a shape retaining, rubbery gel in 45 minutes.

The set gel is useful as a cement in a variety of oil well treating applications. In a specific use, a slurry prepared as described above is placed in the annulus defined by two concentric oil well casings. When set, the composition provides a highly adherent and persistent annular seal.

To illustrate set time control with Group III organo solvents, a second formulation was prepared with a 50/50 mixture of ethylene glycol and diethylene glycol, which are a solvent and non-solvent for the polymer respectively. To 100 milliliters of this mixture at 75°F. was added 75 grams of the above polymer. After about 4 hours, the composition achieved an initial set to produce a solid, rubbery cement. By way of comparison, 75 grams of the polymer in 100 milliliters of diethylene glycol remained fluid through 48 hours, after which the test was terminated.

Through the conjoint use of the non-solvent and solvent to prepare the organo solvent, the set time of the composition was extended by over 3 hours. The longer set time permits batchwise preparation of the formulation and otherwise more extensive handling thereof prior to use.

EXAMPLE 2

To exemplify the metal surface adhesion of cementitious compositions prepared in accordance with the invention, a quantity of the formulation in the above example prepared with the Group III solvent was poured into a vertically aligned pipe, the lower end of which was plugged with a rubber stopper. The composition was allowed to cure for about 20 hours at 75°F. In a second run, the temperature was increased to 150°C. In this manner, plug seals about 12 inches long were produced in each pipe. The set time of the composition at these temperatures was determined as the length of time required for the organo solvent-polymer slurry to form a shape retaining mass.

To measure seal quality, the upper end of the pipe was fitted with a high pressure cap and the rubber stopper removed. Nitrogen gas was applied gradually to the seal until it failed or withstood the maximum pressure for 10 minutes. The maximum pressure applied with this technique was 1,000 pounds per square inch.

In still further runs similar to the above, a series of compositions were prepared in which portions of the polymer were replaced with corresponding amounts of magnesium hydroxide. The curing and testing conditions were as discussed above.

The compositions, set times for cures at 75°F. and 150°F., and adhesion strength properties for the above operations are included in the following table:

TABLE 2

| Diethylene Glycol (Volume %) | Ethylene Glycol (Volume %) | Set Time (Minutes) | Temperatures at Time of Set (°F.) |
| --- | --- | --- | --- |
| 0 | 100 | 15 | 106 |
| 50 | 50 | 27 | 128 |
| 80 | 20 | 49 | 144 |
| 100 | 0 | 80+ | 144 |

TABLE I

| | FORMULATION | | | | PROPERTIES | | |
| --- | --- | --- | --- | --- | --- | --- | --- |
| Run | Carbamoyl Polymer | Ethylene Glycol | Diethylene Glycol | Mg(OH)$_2$ | Yield Strength (psi) | Set Time (Hrs.) 75°F. | 150°F. |
| (1) | 75 gms. | 100 ml. | — | 0 | 650 | 0.75 | 0.05 |
| (2) | 75 gms. | 50 ml. | 50 ml. | 0 | 650 | 4 | 0.2 |
| (3) | 74 gms. | do. | do. | 1 gm. | 400 | 4 | 0.2 |
| (4) | 73 gms. | do. | do. | 2 gm. | 500 | 4 | 0.2 |
| (5) | 72 gms. | do. | do. | 3 gm. | 1000 | 4 | 0.2 |
| (6) | 70 gms. | do. | do. | 5 gm. | 1000 | 4 | 0.2 |
| (7) | 68 gms. | do. | do. | 7 gm. | 1000 | 4.5 | 0.25 |

EXAMPLE 3

Gel times for polymer-solvent mixtures of the invention were ascertained according to the procedure set forth in Section 9, Schedule 6, of API-RP 10B, Twelfth Edition, March 1963. Basically, the procedure involved using the thickening time tester as therein described. The test device was charged with a polymer-solvent system to be tested. In these operations, the formulations were heated to a maximum of 144°F. in 36 minutes during which time continuous viscosity measurements were made. Thickening or gellation set times were measured as the elapsed time between starting the heating of the formulation and the occurrence of a slurry consistency of 100 poises. The thickening times of several formulations are set forth in the following Table 2.

The formulations tested include a polyacrylamide having a molecular weight of at least about one million mixed with each ethylene glycol and diethylene glycol, and mixtures of the two glycols. Sixty grams of the polymer were slurried in 100 milliliters of the particular organo solvent used. The results of these tests are set forth in the following Table 2.

Of the above runs, Run number 3 is a preferred formulation for employment in a well with a bottom hole temperature of 144°F. The set time of 49 minutes allows sufficient opportunity for placing the composition in the well prior to its setting and thus becoming unworkable.

EXAMPLE 4

A series of formulations was prepared in accordance with the invention using Group II solvents. The series illustrates the effect of increasing amounts of water on

TABLE 3

| Organo Solvent | Wt. % Water Added | Gel Time (Hours) at Specified Temp. (°F.) | | | | | |
| --- | --- | --- | --- | --- | --- | --- | --- |
| | | 80 | 100 | 120 | 150 | 175 | 200 |
| Diethylene glycol | 0 | — | — | 48 | 14 | 3.5 | 1.5 |
| do. | 2 | — | — | 20 | 8 | 2 | 0.7 |
| do. | 5 | — | 18 | 5 | 1.4 | 0.5 | — |
| do. | 10 | 4 | 2 | 1 | 0.5 | — | — |
| do. | 16.6 | 0.7 | 0.5 | 0.3 | — | — | — |
| Triethylene glycol | 0 | — | — | — | — | — | 48 |
| do. | 5 | — | — | — | — | 48 | 15 |
| do. | 10 | — | 32 | 16 | 6 | — | — |
| Propylene glycol | 0 | — | — | 32 | 8 | 2.5 | 1 |
| do. | 2 | — | 30 | 14 | 3 | 0.7 | — |
| do. | 5 | 16 | 8 | 3 | 0.7 | — | — |
| do. | 10 | 3 | 1.3 | 0.5 | — | — | — |
| do. | 16.6 | 0.7 | 0.4 | — | — | — | — |
| Dipropylene Glycol | 0 | — | — | — | — | — | 48 |
| do. | 10 | — | — | — | 48 | 30 | — |
| Diethanol amine | 0 | — | — | — | — | — | 48 |
| do. | 10 | — | — | — | 48 | 16 | 6 | the set time of the formulation. To 100 milliliters of a particular organo solvent was added 60 grams of the polyacrylamide used in Example 1. The alliquots of each formulation were maintained at different temperatures ranging from 80° to 200°F. The elapsed time from formulation of the polymer-solvent slurry until a hardened gel formed was measured and is reported in the following table as the gel time.

EXAMPLE 5

Although water-soluble carbamoyl polymers are preferred for use in the invention, useful cementitious compositions can be formulated from any of a wide variety of other types of water-soluble organic polymers. To illustrate the general applicability of the invention, exemplary species of natural gums, natural proteins, polysaccharide derivatives, vinyl polymers other than carbamoyl polymers, polyurethanes and polyethylene oxides were evaluated with each of three organo solvents. All of the polymers tested, were characterized by high molecular weights as hereinbefore defined. Representative of Group I solvents were ethylene glycol and ethanolamine. Representative of Group II was a 66 percent by weight solution of sucrose in water.

The polymer being evaluated was added to 50 milliliters of the organo solvent in small increments until a definite increase in slurry viscosity was apparent. This amount of polymer was then mixed with 50 milliliters of the solvent first at 80°F. and, if no set resulted within 48 hours, again with the solvent at 150°F.

The amounts of polymer used to produce a gel and the temperature at which gelation was obtained are set forth in the following table along with the set time of the particular composition in hours.

aryl ethers of the polymers wherein the etherifying moiety contains from 1 to 12 carbons and (b) at least about 0.05 part by weight per part by weight of the non-solvent, of an organic solvent for the polymer, the amount of the latter being sufficient to render the liquid mixture a solvent for the polymer, said organic solvent being glycerol.

2. A composition as in claim 1 wherein the carbamoyl polymer is a polyacrylamide.

3. A composition as in claim 1 wherein the carbamoyl is a styrene maleamide copolymer.

4. A composition as in claim 1 wherein the carbamoyl polymer is characterized by an ethylenically polymerized polyalkane backbone in which at least about 25 mole percent of the polymerized mers have substituent groups of the formula:

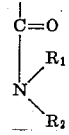

wherein $R_1$ and $R_2$ are independently selected from the group of hydrogen and alkyl hydrocarbons with one to four carbons.

5. A composition as in claim 1 wherein the amount of organo solvent is controlled in relation to the organo non-solvent to provide a predetermined set time.

6. A composition as in claim 1 and including a finely divided solid oxide, hydroxide or a salt of a polyvalent metal.

TABLE 4

| Water-soluble Polymers | Ethylene Glycol | | | Monoethanol Amine | | | 66% Sucrose in Water | | |
|---|---|---|---|---|---|---|---|---|---|
| | Temp. °F. | Polymer Amt. (gms) | Set Time (hrs) | Cure Temp. °F. | Polymer Amt. (gms) | Set Time (hrs) | Cure Temp. °F. | Polymer Amt. (gms) | Set Time (hrs) |
| Guar gum | 80 | 34 | 24 | 150 | 40 | 0.25 | 80 | 20 | 0.1 |
| Karaya gum | 80 | 39 | 0.25 | 80 | 44 | 0.25 | 80 | 45 | 0.1 |
| Tragacanth gum | 80 | 39 | 0.25 | 80 | 42 | 0.25 | 80 | 17 | 0.1 |
| Zein | 80 | 31 | NS(2) | 80 | 25 | 0.1 | 150 | 17 | 24 |
| Gelatin | 80 | 43 | 0.25 | 80 | 38 | 0.25 | 80 | 19 | 4 |
| Corn Starch | 80 | 45 | NS[2] | 80 | 49 | 0.25 | 150 | 26 | NS[2] |
| Carboxymethyl cellulose | 80 | 37 | 4 | 150 | 28 | NS[2] | 80 | 17 | 0.1 |
| Sodium polystyrene sulfonate | 80 | 13 | 0.1 | 80 | 33 | 0.25 | 80 | 7 | 0.25 |
| Poly-N-vinyl pyrrolidone done (water-swellable) | 80 | 25 | 0.1 | 80 | 33 | 0.25 | 80 | 15 | 0.25 |
| Polyurethane[1] | 150 | 34 | 0.25 | 150 | 35 | NS[2] | 80 | 24 | 48 |
| Polyethylene oxide | 150 | 14 | 0.25 | 150 | 18 | NS[2] | 150 | 13 | 24 |
| Polyvinylalcohol | 150 | 18 | NS[2] | 80 | 27 | 24 | 80 | 14 | NS[2] |
| Vinylacetate-maleic halfamide copolymer | 80 | 39 | 0.5 | 80 | 35 | NS[2] | 150 | 15 | 24 |

[1] This is the reaction product of a polyglycol of 10,000 average molecular weight and a small amount of toluene diisiocyanate.
[2] NS means not satisfactory as the result of poor final properties, e.g., the product crumbles or there is no gel formation at all.

What is claimed is:

1. A composition of matter which comprises a liquid slurry of from about 0.1 to about 2 parts by weight of a water-soluble carbamoyl polymer per part by weight of a liquid, gel forming organo solvent therefor composed of a liquid organic non-solvent for the polymer selected from the group consisting of propylene glycol, water-miscible alkylene oxide polymers having molecular weight up to about 600 and water-miscible alkyl and

* * * * *